United States Patent Office 3,146,147
Patented Aug. 25, 1964

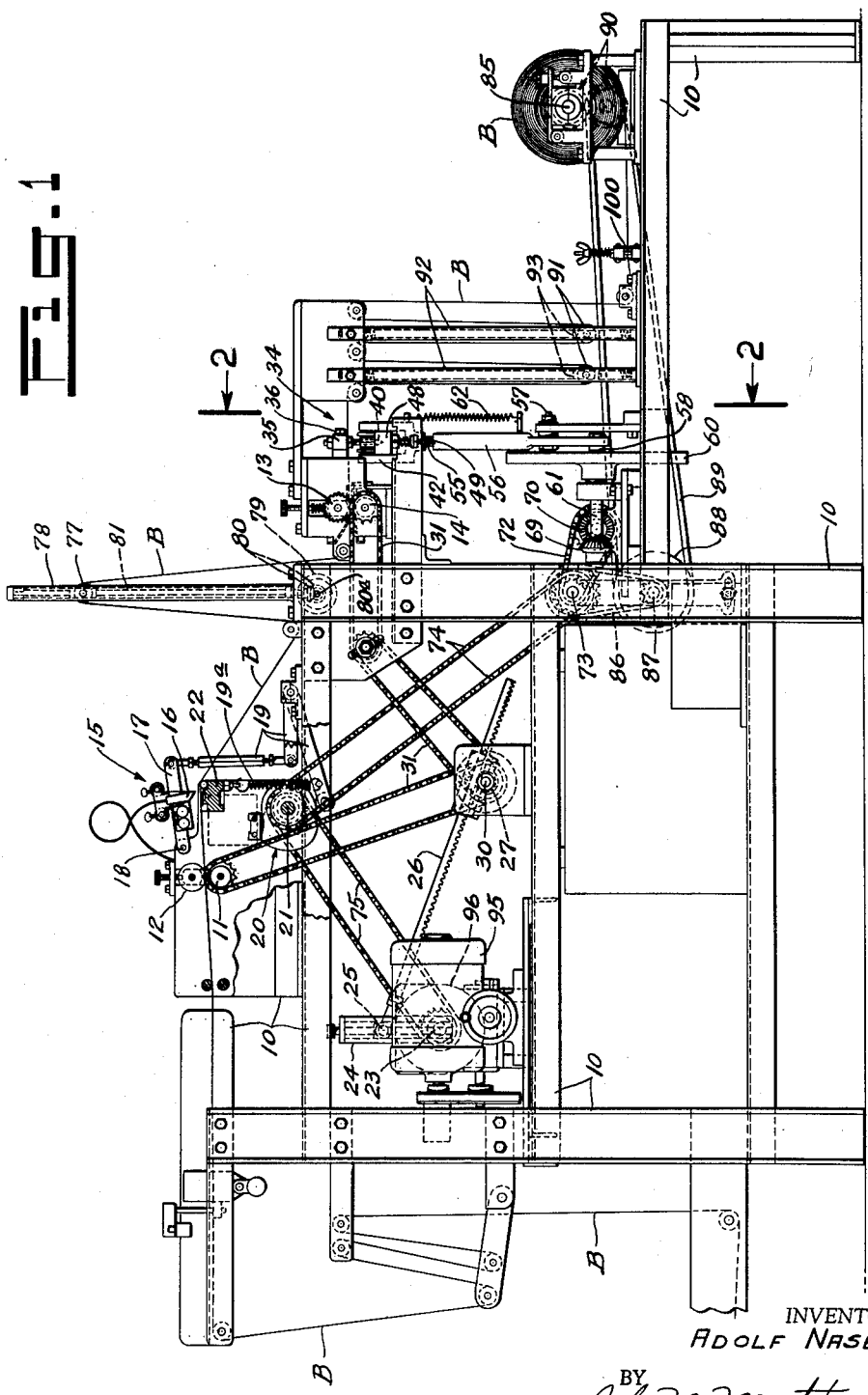

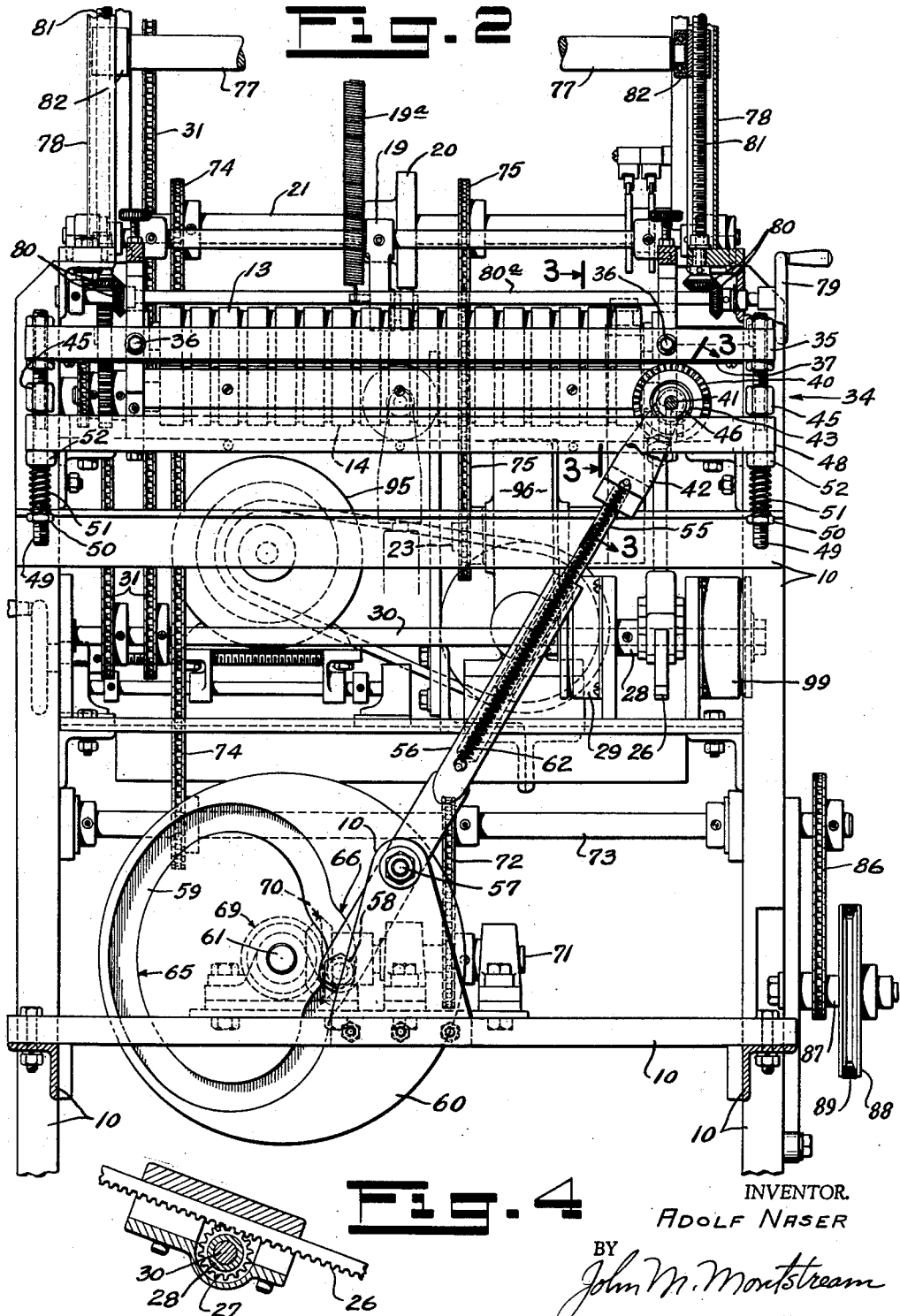

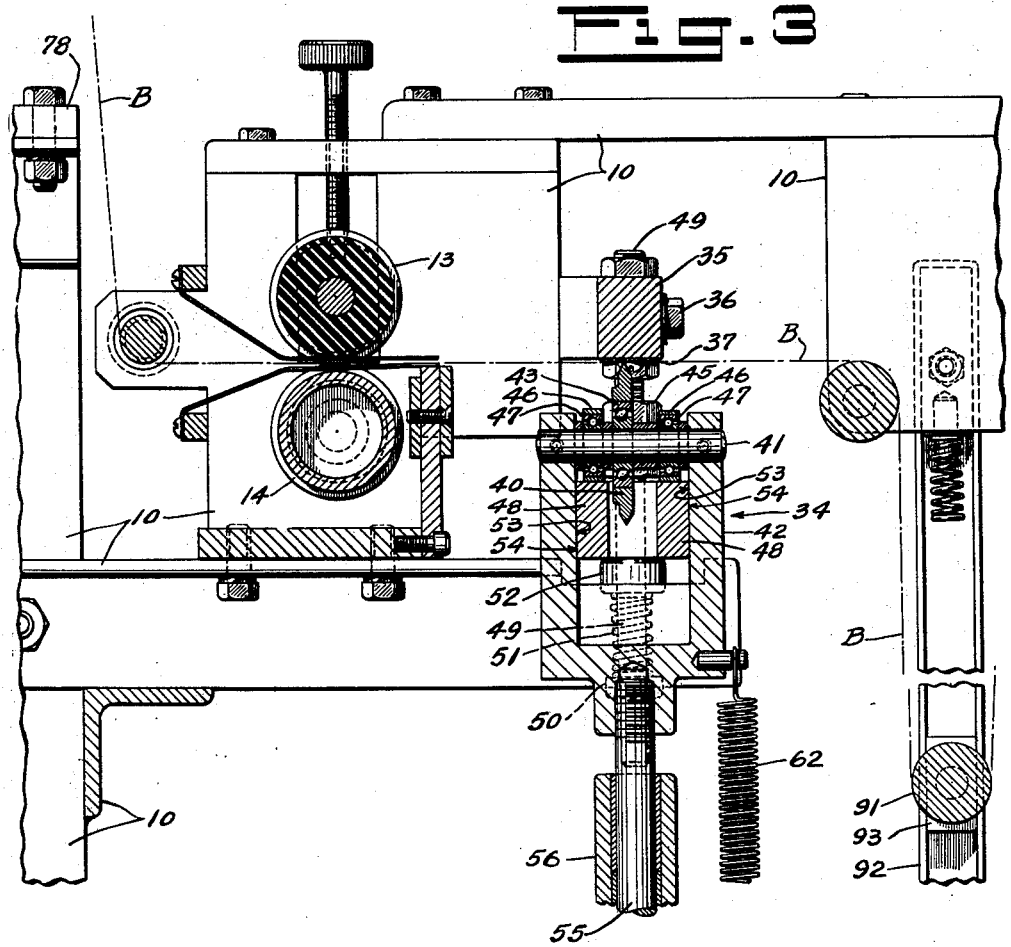

3,146,147
BAG MAKING MACHINE WITH CUTTING MECHANISM AND THE CUTTING MECHANISM
Adolf Naser, Bellerose, N.Y., assignor to Altair Machinery Corporation, New York, N.Y., a corporation of New York
Filed June 8, 1961, Ser. No. 115,627
16 Claims. (Cl. 156—353)

The invention relates to a cutting mechanism for cutting a band of material and has particular applicability for a bag making machine. The invention also relates to a bag making machine including in combination the cutting mechanism. In such machines a tubular band of heat weldable material such as plastic passes through the machine and sealing means welds the tube together across the band in a narrow strip to form the bottom of a bag. This band of tubular material is then severed or tear perforated across the band adjacent to the welded strip so that one end of the bag has a bottom formed by the weld or seal and the other end is open. Although the machine illustrated shows a single tubular band passing through the machine, it will operate on a plurality of bands of material in side by side relation.

It is an object of the invention to construct a band cutting mechanism which severs or perforates for tear crosswise of a tubular band of material adjacent to the welded strip which forms the bottom of the bag.

Another object of the invention is to construct a cutting mechanism in which the cutter reciprocates across the band of material in one direction when the band of material is first halted or stationary to make one cut and returns across the band in the other direction the second time that the band of material is halted or stationary to make a second cut and so on.

Another object of the invention is to construct a bag making machine using a tubular band of material which is sealed or welded across the band in a narrow strip and in which the cutter mechanism reciprocates across the band of material adjacent to the strip to sever or tear perforate the band into bags.

Other objects of the invention will be more apparent from the following description when taken in connection with the accompanying drawings illustrating a preferred embodiment thereof in which:

FIG. 1 is a side elevation of the bag making machine;
FIG. 2 is an enlarged end view of the machine showing details of the cutter mechanism as taken on line 2—2 of FIG. 1; and
FIG. 3 is a section through the cutter, cutter frame and feed rollers taken on line 3—3 of FIG. 2; and
FIG. 4 shows the rack connection.

The bag making machine shown makes bags from a long band B of tubular plastic which is weldable together by heating. The tubular band of plastic is preferably a seamless extruded tube. The machine has a frame 10 of any suitable construction having a pair of spaced feed rolls 11 and 12 between which the band of material B passes from a suitable supply roll (not shown). A second pair of feed rolls 13 and 14 is provided farther along the path of travel of the band of material to feed the band of bag material to the cutter mechanism. The bag material passes a heat sealing or welding means 15 normally spaced therefrom and inoperative which utilizes a heating bar 16 carried on arms 17 which are pivotally mounted on the frame on a pivot 18. It is customary to heat the bar 16 with an electric heater. The sealing means is shown above the band B but this is not essential. The arms are connected through a linkage of levers 19 operated by a cam 20 carried on a shaft 21 so that when the band B is stationary, the cam brings the heating bar onto the band which is backed up by an anvil 22 and welds the sides of the tube together in a more or less narrow strip across the band to form the closed bottom of the bag. A spring 19a normally propels the sealing means away from the band B.

Intermittent drive means is provided for the feed rolls which may be of any suitable construction, that shown including a radius arm 24 secured to and rotated by a shaft 23. The radius arm carries a pivot 25, adjustable radially on the radius arm in known manner, to change the extent or length of the feed of the bag material and hence the length of the bag. The pivot 25 is connected with a rack 26 and the rack meshes with a rack gear 27 carried on a tubular shaft 28. The shaft 28 is connected with a one way clutch 29 which clutch is connected with a shaft 30. The shaft 30 is therefore driven solely in one direction upon movement of the rack. This shaft 30 is connected through sprockets and a chain 31 to the driving feed rolls 11 and 14.

After passing through the feed rolls 13, 14, the tubular bag material, with a strip heat sealed across the material, is presented to the cutter mechanism 34 shown in detail in FIGS. 2 and 3. The cutter mechanism includes a cutter bar 35 which is secured to the frame 10 in any suitable manner such as by bolts 36. The cutter bar preferably has a thin wear strip 37 of harder steel secured to the cutting face, or particularly the lower surface thereof, for engagement by the cutter.

The cutter mechanism also includes cutter means and operating means to move the cutter means across the machine. The cutter means includes a circular disc cutter 40 which has a sharp cutting periphery. The cutting periphery may be continuous for completely severing the tubular band of material or it may be serrated, as shown, so that the band of material or the plurality of attached bags has a perforated tear edge or line across the band. The cutter means suitably mounts the cutter for rotation including an axle extending at right angles generally with respect to the cutter bar and spaced therefrom. In the construction particularly shown, the cutter is rotatably mounted on a cutter axle 41 fixed to a U-shaped cutter frame or carriage 42. With the axle fixed to the cutter frame, it forms a part of this frame. The cutter is shown as rotatively mounted on the axle by a ball bearing 43. The cutter means preferably carries pressure roll means, shown particularly as a pair of pressure rolls 46 and are conveniently carried by the cutter frame or particularly by the fixed axle. One pressure roll is provided on each side of the cutter. With the pressure rolls of a diameter different from that of the cutter, they should be separate from the cutter and hence each is mounted on the axle on its own ball bearing 47.

Mounting and pressure means is provided to mount the cutter means for movement across the machine and to press the cutter against the cutter bar. This means includes particularly pressure bar means engaging the pressure roll means and with two pressure rolls as shown, a pair of spaced pressure bars 48 are mounted on the frame, or particularly on the ends of the cutter bar. The pressure bar means serves as a mounting track for the cutter means. In the arrangement shown, with the cutter engaging the underside of the cutter bar, the upper surface of each pressure bar engages a pressure roll 46. The pressure bars are movably mounted for movement towards and away from the cutter bar on threaded bolts 49 which bolts are shown as secured to and extend downwardly from the cutter bar 35 on each end thereof. This mounting is equivalent to a mounting on the frame. An adjusting nut 50 is received on the threaded bolt 49. A compression spring 51 is provided between each adjusting nut 50 and the pressure bar 48 or particularly a collar 52 which is freely slidable on its bolt and engages the pressure bar. The springs 51 press the pressure bars 48 upwardly and through the pressure rolls 46 press the cutter against the cutter bar 35. A limit nut 45 may be provided on each bolt adjusted to a position spaced slightly above the pressure bars.

The mounting and pressure means serve also to retain the cutter means or frame in vertical position and against twisting. This function is accomplished by having cooperating surfaces on the cutter frame and the pressure bar means. The construction particularly shown includes outer faces or surfaces 53 of the pressure bar means 48 engaging surfaces of the cutter frame or particularly the inner surfaces 54 of the U-shaped cutter frame 42.

Operating means is provided to move the cutter means with its cutter across the band of material in one direction when the band is stationary whereupon the cutter means remains on this side until the band advances one bag interval or length, and again is stationary whereupon the cutter means is returned in the opposite direction to the initial side thereof with the cutter cutting the band. The cutter means remains on this side until the operation is repeated. The operating means particularly shown is mechanical and includes a slide 55 secured to the cutter frame or cutter carriage 42. This slide is slidably received by an operating lever 56 having a guideway, shown as a bore into the end of the lever. Preferably a spring 62 is connected between the cutter frame 42 and the operating lever 56 to pull the cutter frame downwardly against the pressure bars. This spring will have a tension less than the combined compression of the springs 51 which press the cutter against the cutter bar so that the springs 51 are dominant. The lever is pivoted on a pivot 57 carried by the frame 10 the axis of which is at right angles to the cutter bar and spaced therefrom. The lever may be operated by a cam, and as shown, the lever extends beyond the pivot 57 and carries a cam follower 58 which is received in a cam track 59 carried by a suitable cam 60. The cam shown is of the disc type. The cam is rotatably mounted by being secured to a rotatably mounted shaft 61.

The cam track 59 has two dwell portions 65 and 66 which with a disc cam would be of two different radii but each of which is of one radius. The dwell portions are about 90 degrees in extent and spaced oppositely from each other with respect to the shaft 61. The radius or dwell portion 65 is of large radius and the radius or dwell portion 66 is of smaller radius and the oscillating or drive portions of the cam track therebetween pivots the operating lever 56 on its pivot 57. The radius portions of the cam track provide a dwell in the oscillation of the operating lever and the reciprocation of the cutter during which dwells the band B of material is fed or advanced by the feed rollers for one bag length. When the band of material is stationary, a drive portion of the cam track moves the cam follower 58 generally radially with respect to the cam axis or shaft 61 and pivots the operating lever 56 to sweep the cutter wheel 40 across the band of material either severing it or perforating the same. The cam follower 58 then passes through the following radius portion thereby holding the cutter at the other side of the band of material B while the band is intermittently advanced one bag length through the machine whereupon the next oscillating portion of the cam track pivots the lever 56 for a return movement and sweeps the cutter across the band in the opposite direction to cut a second bag and return the cutter to initial position. The cam disc 60 is continuously driven but is timed with the heater cam 20 and the rotation of the radius arm 24 by the drive connections so that the band B is fed or advanced when the cutter is stationary at the edge of the band or at a dwell portion on the cam track. The cutter is propelled across the band of material in either direction only when the band is stationary.

The cam disc is rotated by the shaft 61 through bevel gears 69 and 70. The bevel gear 70 is secured to a shaft 71 which is connected through sprockets and chain 72 to a cross shaft 73, which cross shaft is driven by sprockets and chain 74 from the cam shaft 21. The cam shaft in turn is driven by sprockets and chain 75 from shaft 23.

In order to be able to adjust the length of bag material or the path of the material between the sealing means 15 and the cutter so that the cutter will operate adjacent to the heat sealed or welded strip of the band B, means are provided to adjust the length of the path of material therebetween. This means includes an adjusting roll 77 having its ends mounted in screw blocks 82 which blocks are slidably mounted on spaced pedestals 78. The position of the adjusting roll 77 may be adjusted by a hand wheel 79 which is connected through bevel gears 80 and shaft 80a to screw shaft 81 on each pedestal which shafts pass through the screw blocks 82. In order to shorten the length of material between the heat sealing means 15 and the cutter, the roll 77 is adjusted to a lower position. In order to increase the length of the tubular material therebetween the adjusting roll 77 is raised. This adjustment therefore is utilized to bring the cutter adjacent to the weld or seal in the band B and thence too to adjust for different lengths of bags.

When the tubular material is cut with tear perforations as with the serrated cutter particularly shown, the tubular material remains as a continuous band and is wound up on a wind-up roll carried by the shaft 85. This roll is continuously driven from the shaft 73 through sprockets and a chain 86 (FIG. 2) which drives a stub shaft 87 on which is mounted a pulley 88. This pulley receives a belt 89 which is connected with the wind-up shaft 85 through gears 90. The wind-up roll also forms part of the bag material feeding means with the feed rolls 11, 12 and 13, 14. Preferably a drag device 100 engages the band or material just before the wind-up roll to provide proper tension thereon.

Since the band of material B is intermittently fed through the machine and the wind up roll and shaft 85 is continuously rotating or driven, means are provided to automatically adjust for this condition. The means particularly shown in FIG. 3 include one or more slide rolls 91 which have slide blocks 93 which are freely slidable in uprights 92. Two such means are shown. When the band of material B is halted, or stationary in order to seal and cut the band, the wind-up roll continues to wind up so that the length of the band shortens between the wind-up roll and the feed rolls 13, 14 or the cutter mechanism. As it shortens, the slide rolls 91 move upwardly in their uprights and when the band again starts feeding through the feed rolls 13, 14 these rolls slide downwardly by gravity. In this way the band of material is kept sufficiently taut between the intermittently driven feed rolls 13, 14 and the continuously driven wind-up roll or shaft 85. In addition it compensates for the unequal winding of the wind-up roll as the diameter of the material thereon increases.

The entire machine is driven by a motor 95 which is suitably connected with a gear reduction unit 96 which drives shaft 23. When the bags are to be severed from the band, the cutter has a continuous periphery and the severed bags are suitably stacked after being cut.

It is desirable that a brake or drag 99 be provided on the shaft 30 so that there will be no overrunning of the feed rolls due to inertia of the driven parts or otherwise.

This invention is presented to fill a need for improvements in a bag making machine with cutting mechanism and the cutting mechanism. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. Cutting mechanism for a bag making machine which intermittently feeds the bag material comprising a frame, a stationary cutter bar carried by the frame and having a lower surface and extending across the machine; cutter means including a cutter frame, a circular disc cutter, and means rotatably mounting the cutter on the cutter frame including an axle spaced from and extending at right angles relatively to the cutter bar; mounting and pressure means located below the cutter bar and mounting the cutter means for reciprocation across the machine with the cutter engaging the lower surface of the cutter bar and for pressing the cutter against the cutter bar, means to adjust the pressure means, and operating means connected with the cutter means to reciprocate the latter and the cutter along the cutter bar when the bag material is stationary.

2. Cutting mechanism as in claim 1 in which the mounting and pressure means for the cutter means includes pressure bar means mounting the cutter means for movement of the cutter along the cutter bar, means mounting the pressure bar means adjacent to the cutter bar and for movement toward and away from the cutter bar, means carried by the cutter frame and engaging the pressure bar means and pressure means engaging the pressure bar means and propelling the latter and the cutter means upwardly towards the cutter bar.

3. Cutting mechanism as in claim 2 in which the cutter means includes pressure roll means carried by the cutter frame and engaging the pressure bar means.

4. Cutting mechanism as in claim 2 in which the cutter frame and the pressure bar means have cooperating engaging surfaces to retain the cutter frame vertical and against twisting.

5. Cutting mechanism as in claim 2 in which the cutter frame is U-shaped with inner surfaces, and the pressure bar means having outer surfaces engaging the inner surfaces of the cutter frame to retain the latter vertical and against twisting.

6. Cutting mechanism as in claim 1 in which the axle is fixed to the cutter frame, and the cutter is rotatably mounted on the axle.

7. Cutting mechanism as in claim 6 in which the mounting and pressure means includes pressure bar means mounting the cutter means, means mounting the pressure bar means adjacent to the cutter bar and for movement toward and away from the latter, means to propel the pressure bar means upwardly towards the cutter bar, and pressure roll means rotatably mounted on the axle and engaging the pressure bar means.

8. Cutting mechanism as in claim 7 in which the pressure bar means and the cutter frame are provided with cooperating engaging surfaces to retain the cutter frame vertical and against twisting.

9. Cutting mechanism as in claim 8 in which the cutter frame is U-shaped and the cooperating surfaces on the pressure bar means are the outer surfaces thereof, and the cooperating surfaces on the cutter frame are the inner surfaces of the U-shaped cutter frame.

10. Cutting mechanism as in claim 1 in which the operating means for propelling the cutter frame includes an operating lever pivotally mounted on the frame on an axis spaced from the cutter bar and parallel with the cutter axis, means slidably connecting the operating lever with the cutter frame, and drive means connected with the operating lever to reciprocate the same in one direction when the feed roll means are stationary and in the other direction when the feed roll means are stationary a second time.

11. Cutting mechanism as in claim 10 in which the drive means includes a cam rotatively mounted on the frame and having a cam track, the cam track having a two dwell portion having ends and oscillating portions each connecting one end of two dwell portions, a cam follower carried by the operating lever and engaging in the cam track, and means to continuously drive the cam.

12. A bag making machine using a tubular plastic bag material comprising a machine frame, a first and a second feed roll means rotatably mounted on the frame and spaced from each other, means connected with the feed roll means to intermittently drive the same, means to adjust the stroke of the intermittent drive means, a heat sealing means, means connected with the sealing means to move the latter into and away from contact with the bag material when the material is stationary: in combination with cutting mechanism located on the other side of the second pair of feed roll means including a stationary cutter bar carried by the frame and extending across the machine; cutter means comprising a cutter frame, a circular disc cutter, and means rotatably mounting the cutter on the cutter frame including an axle spaced from and extending at right angles relatively to the cutter bar; mounting and pressure means mounting the cutter means for reciprocation across the machine with the cutter engaging the cutter bar and for pressing the cutter against the cutter bar, and operating means connected with the cutter means to reciprocate the latter across the machine and the cutter along the cutter bar when the bag material is stationary; and means between the cutting mechanism and the sealing device to change the length of the path of the bag material between the sealing device and the cutter mechanism.

13. A bag making machine as in claim 12 in which the cutter has a serrated cutting periphery, wind-up means for the band of material spaced from the cutter mechanism, means continuously driving the wind-up means, and slide roll means for the band of material between the wind-up means and the cutter mechanism.

14. A bag making machine as in claim 12 in which the mounting and pressure means for the cutter means includes pressure bar means mounting the cutter means for movement of the latter along the cutter bar, means mounting the pressure bar means adjacent to the cutter bar and for movement toward and away from the cutter bar, and means carried by the cutter frame and engaging the pressure bar means and propelling the latter and the cutter means towards the cutter bar.

15. A bag making machine as in claim 14 in which the cutter frame is U-shaped with inner surfaces, and the pressure bar means having outer surfaces engaging the inner surfaces of the cutter frame to retain the latter vertical and against twisting.

16. A bag making machine as in claim 13 in which the operating means for propelling the cutter frame includes an operating lever pivotally mounted on the frame on an axis spaced from the cutter bar and parallel with the cutter axis, means slidably connecting the operating lever with the cutter frame, and drive means connected with the operating lever to reciprocate the same in one direction when the feed roll means are stationary and in the other direction when the feed roll means are stationary a second time.

References Cited in the file of this patent

UNITED STATES PATENTS

| | | |
|---|---|---|
| 1,447,091 | Lansing | Feb. 27, 1923 |
| 2,444,685 | Waters | July 6, 1948 |
| 2,884,988 | D'Angelo | May 5, 1959 |
| 2,936,664 | Myers | May 17, 1960 |